United States Patent [19]
Moore

[11] 3,981,422
[45] Sept. 21, 1976

[54] METHOD OF BREAKING GLASS FIBERS AND TOOL THEREFOR

[75] Inventor: John R. Moore, Santa Ana, Calif.

[73] Assignee: International Telephone and Telegraph Corporation, New York, N.Y.

[22] Filed: July 18, 1975

[21] Appl. No.: 597,096

[52] U.S. Cl. .................................. 225/2; 65/87; 65/174; 65/DIG. 7; 225/96.5; 225/103
[51] Int. Cl.² ...................... C03B 33/02; B26F 3/00
[58] Field of Search .............. 225/2, 94, 96, 96.5, 225/97, 103; 254/29 A; 65/87, 174, DIG. 7

[56] References Cited
UNITED STATES PATENTS

| | | | |
|---|---|---|---|
| 2,371,882 | 3/1945 | Freyssinet | 254/29 A |
| 2,746,714 | 5/1956 | Freyssinet | 254/29 A |
| 3,811,652 | 5/1974 | DeValenzuela | 254/29 A |

*Primary Examiner*—Othell M. Simpson
*Assistant Examiner*—Fred A. Silverberg
*Attorney, Agent, or Firm*—Thomas L. Peterson

[57] ABSTRACT

A method of uniformly breaking glass fibers in a bundle of fibers in which the apex of a cone is inserted into the end of the bundle. The fibers in the bundle are distributed in a single plane about the surface of the cone with the free ends of the fibers extending beyond the base of the cone. A sleeve on the bundle is shifted forwardly toward the base of the cone to firmly grip the fibers therebetween. The outer surfaces of the fibers are then scratched and a compressive force is exerted to the free end of the fiber bundle to cause the fibers to bend and break at the base of the cone.

14 Claims, 5 Drawing Figures

METHOD OF BREAKING GLASS FIBERS AND TOOL THEREFOR

BACKGROUND OF THE INVENTION

This invention relates generally to a method and tool for breaking glass fibers and, more particularly, to a method and tool for breaking glass fibers in a bundle of fibers to produce a uniform end break.

In fiber optic transmission systems it is necessary to provide connections or splices between the ends of aligned fiber optic bundles. Normally, the end of each bundle is terminated in a hollow contact or pin, and the end of the pin with the fibers therein is polished to provide a smooth end surface. The polished ends of the bundles are abutted together in the interconnection or splicing arrangement. If the bundle ends are not smooth, light transmission losses will occur in the fiber optic transmission system. Normally, the polishing of a glass fiber bundle in a pin is accomplished by the use of standard metallurgical polishing equipment which includes a rotating polishing disc with water flowing over it to cool and lubricate the surface being polished. Typically, a tool is used for holding and shifting the fiber bundle end into engagement with the rotating disc. The polishing procedure is time-consuming. Frequently a number of polishing discs are required to obtain a highly polished end on a glass fiber bundle. Furthermore, it will be appreciated that polishing equipment of the foregoing type is not normally available in the field where breakage of fiber bundles may occur requiring splicing and therefore polishing of the fiber bundle ends. Certainly polishing by hand in the field is time-consuming and quite inconvenient. Therefore, what is needed is some means for providing a polished end surface for a glass fiber bundle without requiring the use of polishing equipment so that splices or modifications of fiber bundle terminations may be effected in the field as well as in the factory.

It is well known in the glass art that glass fibers can be provided with extremely smooth end surfaces by simply producing a scratch on the fiber and breaking it over a fulcrum obtaining a clean fracture. However, a clean break cannot be provided on the end of a glass fiber bundle utilizing this technique since obviously the interior fibers in the bundle would not be scratched and breaking thereof would produce nonuniform, rough fractures. While it may be possible to provide clean fractures of all the fibers in the bundle by laying the fibers out in a single plane and scratching the surfaces of the fibers utilizing a straight guide laying across the fibers, it will be appreciated that when the fibers are returned to their cylindrical bundle configuration after fracturing, the lengths of the fibers will not be uniform. Thus, polishing of the bundle end would still be required. It is the purpose of the present invention to provide a method and tool for uniformly breaking the ends of the fibers in a glass fiber bundle so that little, if any, polishing of the bundle end is required.

SUMMARY OF THE INVENTION

According to the principal aspect of the present invention, there is provided a method and tool for uniformly breaking glass fibers in a bundle of fibers. The apex of a cone is inserted into the end of the bundle of fibers, and the fibers are distributed in a single plane about the conical surface of the cone with the free ends of the fibers extending beyond the base of the cone. A sleeve mounted over the fiber bundle is shifted forwardly toward the base of the cone to firmly grip the fibers between the end of the sleeve and the cone. The outer surfaces of the fibers are then scratched and the ends of the fibers are bent radially inwardly toward the center axis of the cone, causing the individual fibers to fracture. A clean fracture is obtained of the fibers since the fibers are bent over the outer perimeter of the base of the cone which functions as a sharp fulcrum. Thus, when the sleeve is shifted rearwardly from the cone and the fibers are returned to their normal cylindrical bundle configuration, the length of the fibers will be uniform, and the end of the bundle will have a planar smooth end surface which, for all practical purposes, is as smooth as can be obtained by polishing techniques. It will be appreciated that the parts utilized for performing the method are simple, inexpensive, and may be conveniently utilized in the field. The method is easy to perform, requiring little skill of the user, and is effective to produce a uniform end break for a glass fiber bundle.

Other aspects and advantages of the invention will become more apparent from the following description taken in connection with the accompanying drawings.

DESCRIPTION OF THE PREFERRED EMBODIMENTS

Figure 1:
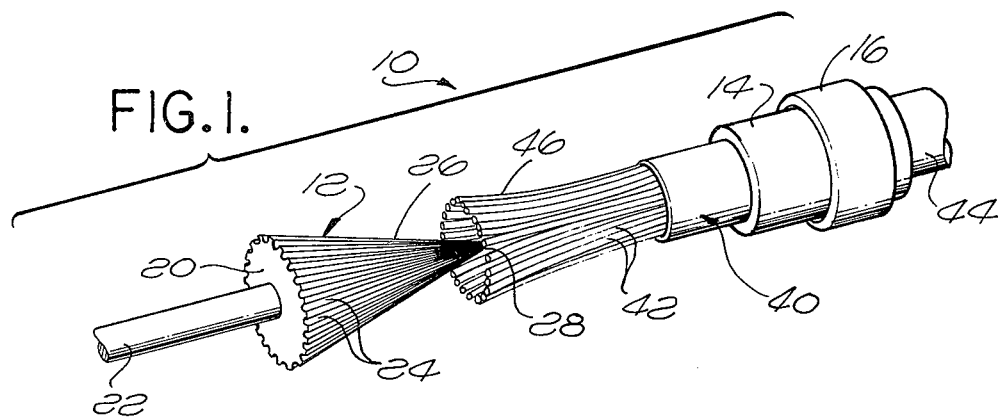
FIG. 1 is a perspective view of a glass fiber bundle with the various parts of the tool of the first embodiment of the invention in an initial position being assembled to the end of the bundle.
Figure 2:
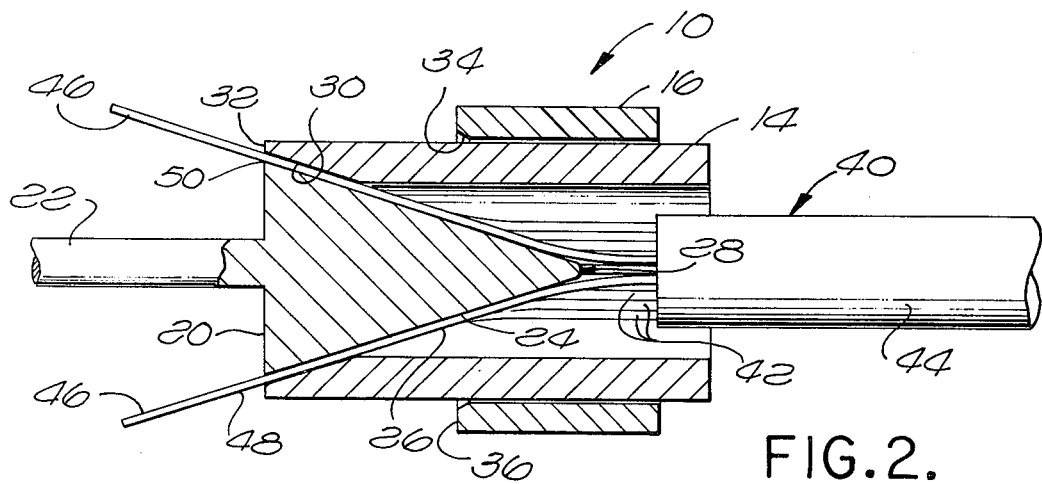
FIG. 2 is a partial longitudinal sectional view of the tool mounted on the bundle end with the fibers firmly held in position between the cone and sleeve of the tool.
Figure 3:
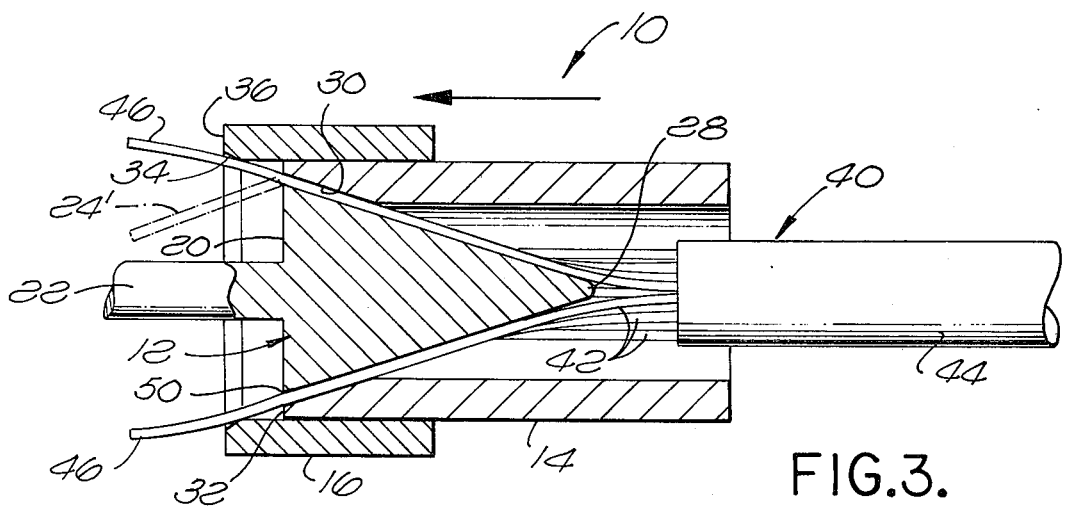
FIG. 3 is partial sectional view similar to FIG. 2 but showing the tool parts positioned to break the ends of the fibers over the base of the cone.

Referring now to FIGS. 1–3 of the drawings in detail, there is illustrated a tool in accordance with the present invention, generally designated 10, which consists of a cone 12, a cylindrical sleeve 14 and a cylindrical member 16 which surrounds the sleeve 14. The cone has a flat planar base 20. A handle 22 coaxial with the center axis of the cone 12 is fixed to the center of the base 20 to facilitate handling and positioning of the cone. A plurality of longitudinally extending uniformly spaced grooves 24 are formed in the conical surface 26 of the cone. The grooves extend from the base 20 part way toward the apex or point 28 of the cone as seen in FIG. 1.

As seen in FIGS. 2 and 3, the inner diameter of the sleeve 14 is less than the diameter of the base 20 of the cone. An internal chamfer 30 is formed on the sleeve 14 adjacent the forward end 32 thereof. The chamfer 30 has a slope corresponding to the slope of the conical surface 26 of the cone. The member 16 surrounds the sleeve 14 and is axially slidable thereon. Preferably, an internal chamfer 34 is formed on the cylindrical member 16 adjacent to its forward end 36.

Reference numeral 40 generally designates an optical fiber bundle which comprises a plurality of glass fibers 42 surrounded by a jacket 44. The fibers extend from the end of the jacket. The tool 10 is utilized for positioning and firmly holding the fibers in a geneally circular array so that when they are fractured in a common plane, the ends of the fibers will have a uniform length when they return to their generally cylindrical array in the form of a bundle. More specifically, initially the sleeve 14 with the cylindrical member 16 mounted thereon is positioned over the fiber bundle 40 as illustrated in FIG. 1. Then, the apex 28 of the cone 12 is inserted into the end of the center of the glass fibers 42 so that the fibers will spread over the surface of the cone. The cone is inserted into the fibers a sufficient distance so that the ends 46 of the fibers extend beyond the base 20 of the cone, as seen in FIG. 2. The fibers are individually located in the grooves 24 on the cone 12 so as to be uniformly dispersed in a single layer over the cone. The depth of the grooves 24 is less than the diameter of the fibers so that the outer surfaces of the fibers will be exposed above the conical surface 26 of the cone. The sleeve 14 may be shifted forwardly toward the base 20 of the cone, as seen in FIG. 2, to faciliate the positioning of the fibers 24. A slight rotative motion of the sleeve will aid in positioning the fibers in the grooves on the cone. After the fibers are properly positioned in the grooves, the sleeve is then shifted to the position illustrated in FIG. 2 wherein the internal chamfer 30 on the sleeve engages the outer surfaces of the fibers firmly gripping them between the end of the sleeve and the cone. Preferably, when the sleeve is so positioned, the forward end 32 thereof is coplanar with the base 20 of the cone.

The fibers are now firmly held in position in a generally conical array. In order to fracture the fibers, the outwardly facing surfaces 48 of the fibers are scratched adjacent to the base 20 of the cone by the use of a suitable tool, such as a carbide or diamond needle (not shown). The needle is moved in a circular path around the conical array of fibers 42 utilizing the forward end 32 of sleeve 14 as a guide so that the fibers are scratched in a plane common to the plane of the base 20 of the cone. Thereafter, the cylindrical member 16 is moved forwardly, as seen in FIG. 3 to engage the free ends 46 of the fibers. Further forward movement of the cylindrical member to the position shown in dotted lines causes the fiber bundle to be compressed. That is, the sleeve effects a radially inwardly directed force on the fibers, causing them to bend at the outer perimeter 50 of the base 20 of the cone, which underlies the scratched regions of the fibers. The outer perimeter 50 of the cone provides a sharp ridge which functions as a fulcrum over which the free ends of the fibers are fractured producing a uniform breakage of each individual fiber. One of the broken fibers is indicated by reference numeral 24' in FIG. 3. After the fibers have been fractured, the sleeve 14 and cylindrical member 16 are shifted rearwardly away from the cone 12, the cone is removed from the end of the fiber bundle and the sleeve and cylindrical member are then slid forwardly off the end of the bundle. The fibers then are returned to their normal cylindrical configuration in the bundle. The fractured ends of the fibers will be smooth and will lie in a common plane. The method of the invention therefore minimizes, if not eliminates, the necessity of polishing the end of the fiber bundle.

It will be appreciated that the method of the invention can be performed without the necessity of the cylindrical member 16 of the tool 10. Such member may be eliminated and the ends 46 of the fibers bent radially inwardly to fracture the same by hand by simply gripping the opposed sides of the conical array of the fiber ends and pressing inwardly toward the handle 22. Obviously, any technique may be utilized which conveniently bends the free ends of the fibers 46 inwardly to fracture them at the fulcrum edge 50 of the cone.

Figure 4:
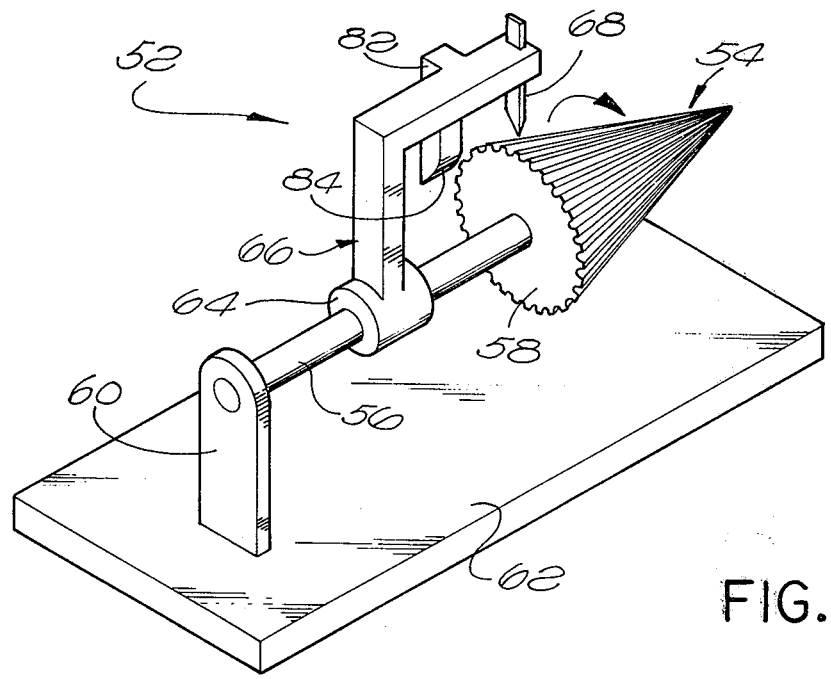
FIG. 4 is a somewhat schematic perspective illustration of a modified structure of a tool which may be utilized in the method of the invention.
Figure 5:
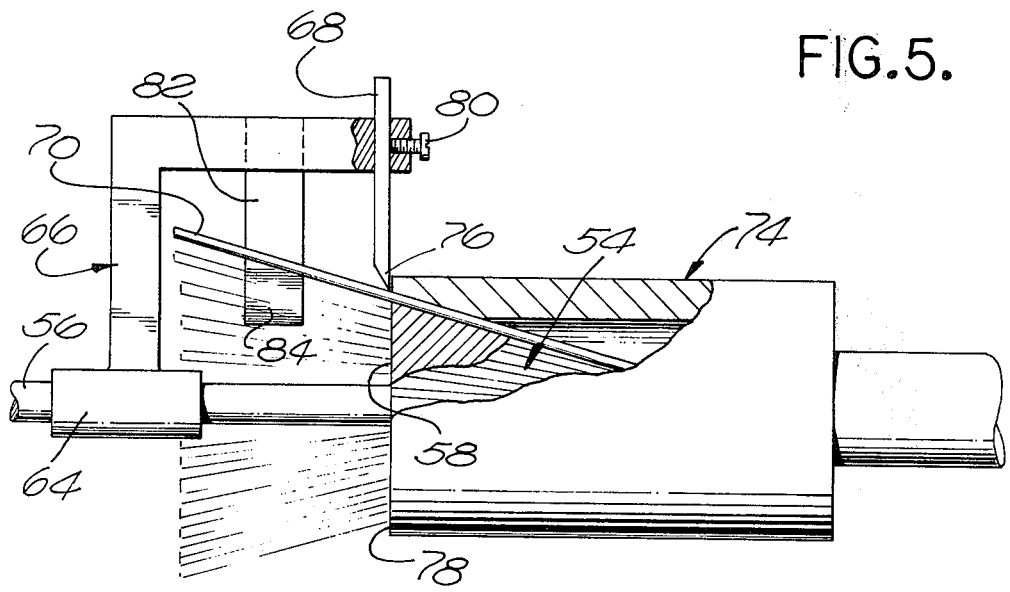
FIG. 5 is a fragmentary side view of the tool illustrated in FIG. 4, in partial section, showing the various parts in position ready to scratch and break the fibers of a bundle.

Reference is made to FIGS. 4 and 5 which illustrate a tool, generally designated 52, which may be utilized for fracturing the fibers over the end of a cone 54. The cone is identical to the cone 12 in FIGS. 1 and 3. The handle of the cone is in the form of a cylindrical shaft 56 which is fixed to the base 58 of the cone and extends horizontally. The end of the shaft 56 is fixed to a vertical support 60 on a plate 63 which underlies and is spaced from the cone 54. A collar 64 is rotatably and slidably mounted on the shaft 56. An L-shaped arm 66 is fixed to the collar 64. At the forward end of the arm there is provided a cutter 68 for scratching the outwardly facing surfaces of the fibers 70 of a fiber bundle 72. The fibers 70 are positioned in grooves on the cone 54 and held therein by a sleeve 74 in the same manner as discussed hereinabove with respect to the tool 10. The cutter may be in the form of a carbide or diamond needle, as hereinbefore explained. The cutter is mounted on the arm 66 with its inner cutting end 76 positioned to slide against the forward end 78 of the sleeve 74. The tip 76 of the cutter may be adjusted radially by the use of a mounting screw 80 which engages the outer end of the cutter so that the tip can be properly positioned to provide scratches in the outwardly facing surfaces of the fibers 70 of the desired depth when the arm 66 is rotated about the shaft 56. The arm 66 also carries a fiber bending element 82 which extends radially inwardly and rearward of the cutter 68 with respect to the direction of rotation of the cutter which is indicated by the arrow in FIG. 4. The lower end of the bending element 82 is formed with an inclined fiber engaging surface 84 which is spaced from the base 86 of the cone 54. The surface 84 is positioned radially inwardly from an imaginary extension of the cone 54 beyond the base 86, which extension is coincident with the conical array of fiber ends 70 illustrated in FIG. 5. Thus, the inclined surface 84 is positioned to engage the fiber ends 70 and to bend them radially inwardly when the arm 66 is rotated about the shaft 56. In practice, the collar 64 is initially positioned adjacent to the vertical support 60 so that the fibers of the bundle 72 may be mounted over the cone 54 in the manner described hereinbefore. After the sleeve 74 is moved into position to firmly hold the fibers on the cone, the collar 64 is moved forwardly to the position illustrated in FIG. 5 with the cutter 68 and element 72 disposed between the ends of two adjacent fibers 70. The arm is positioned so that the cutter is located adjacent to the forward surface 78 of sleeve 74. Then the arm 66 is rotated about the shaft 56 in the direction indicated by the arrow in FIG. 4. Since the cutter 68 is in advance of the bending element 82, each fiber will be individually scratched and thereafter immediately bent radially inwardly to fracture over the perimeter of the base of the cone 54. Thus, in a single rotative motion of the arm 66 the fiber ends 70 of the bundle 72 are uniformly fractured. Thereafter, the arm 66 and sleeve 74 are retracted in opposite directions and the bundle 72 is removed from the cone 54. It will be appreciated that although in the tool 52, illustrated in FIGS. 4 and 5, the scratching and bending arm 66 is rotatable on a shaft 56 fixed to the cone 54, the arm 66 could be rotatable on a fixed sleeve 74 and the cone 54 could be a separate part which is movable into the sleeve.

From the foregoing, it is seen that by the present invention there is provided a simple tool and method for individually breaking glass fibers within a bundle to produce a uniform end break. The method can be practiced as conveniently in the field as in the factory. The method minimizes, if not eliminates, the necessity of polishing the end of the glass fiber bundle. The invention therefore greatly simplifies and facilitates the forming of splices in optical fiber bundles in the field and the preparation of fiber bundles for mounting in fiber optic connectors in the field.

What is claimed is:

1. A method of uniformly breaking glass fibers in a bundle of fibers comprising the steps of:
   inserting the apex of a cone into the end of a bundle of fibers to position the fibers in a single layer about the surface of the cone with the free ends of the fibers extending beyond the base of the cone;
   shifting a sleeve surrounding said bundle forwardly toward said base to firmly grip the fibers between the end of the sleeve and said cone; and
   severing the ends of the fibers extending beyond said base.

2. A method as set forth in claim 1 wherein:
   said fibers are severed at said base.

3. A method as set forth in claim 1 wherein:
   the outer perimeter of said base of said cone is used as a fulcrum over which said fibers are bent to sever the same.

4. A method as set forth in claim 1 wherein:
   said fibers are severed by first scratching the surface thereof and then bending the fibers where scratched.

5. A method as set forth in claim 1 wherein:
   said fibers are scratched on the outwardly facing surfaces thereof; and
   said fibers are bent by exerting a radially inwardly directed force on the ends of said fibers.

6. A method as set forth in claim 1 including the step of:
   uniformly distributing said fibers over said cone before shifting said sleeve to said base.

7. A method as set forth in claim 1 wherein:
   said sleeve is shifted forwardly until the forward end thereof is coplanar with said base;
   the outwardly facing surfaces of said fibers are scratched immediately adjacent to said base and sleeve end; and
   said fibers are severed by bending the same radially inwardly using the outer perimeter of said base as a fulcrum until said fibers break.

8. A tool for holding glass fibers in a bundle of fibers to facilitate uniform breaking of the fibers comprising:
   a cone over which said fibers may be positioned with their ends extending beyond the base of said cone;
   a sleeve having an inner diameter less than the diameter of the base of said cone, said sleeve being adapted to surround said cone and be shifted forwardly toward said base to firmly grip said fibers between said sleeve and said cone; and
   means for exerting a radially inwardly directed force on said fibers adjacent to said base of said cone.

9. A tool as set forth in claim 8 wherein:
   said sleeve has an internal chamfer thereon at its end adjacent to said base, said chamfer having a slope corresponding to the slope of the conical surface of said cone.

10. A tool as set forth in claim 8 wherein:
    said means comprises a cylindrical member telescopically mounted on said sleeve.

11. A tool as set forth in claim 8 wherein:
    the conical surface of said cone has longtitudinally extending uniformly spaced grooves therein, the depth of each groove being less than the diameter of one of said fibers.

12. A tool for holding glass fibers in a bundle of fibers to facilitate uniform breaking of the fibers comprising:
    a cone over which said fibers may be positioned with their ends extending beyond the base of said cone;
    a sleeve having an inner diameter less than the diameter of the base of said cone, said sleeve being adapted to surround said cone and be shifted forwardly toward said base to firmly grip said fibers between said sleeve and said cone; and
    means for scratching said fibers adjacent to said base.

13. A tool for holding glass fibers in a bundle of fibers to facilitate uniform breaking of the fibers comprising:
    a cone over which said fibers may be positioned with their ends extending beyond the base of said cone;
    a sleeve having an inner diameter less than the diameter of the base of said cone, said sleeve being adapted to surround said cone and be shifted forwardly toward said base to firmly grip said fibers between said sleeve and said cone;
    an arm rotatable in a circular path about the center axis of said cone adjacent to said base; and
    a cutter on said arm positioned to scratch the outwardly facing surfaces of said fibers on said cone at said base.

14. A tool as set forth in claim 13 including:
    fiber bending means on said arm spaced from said cutter, said fiber bending means having a fiber engaging surface thereon positioned to rotate in a plane transverse to said axis and spaced from said base; and
    said fiber engaging surface being positioned radially inwardly from an imaginary extension of said cone beyond said base whereby said surface will effect inward bending of said fibers upon rotation of said arm.

* * * * *